Oct. 11, 1949.　　　　L. DOERFLER　　　　2,484,404
DRESSING TOOL
Filed Nov. 13, 1947　　　　　　　　　　2 Sheets-Sheet 1
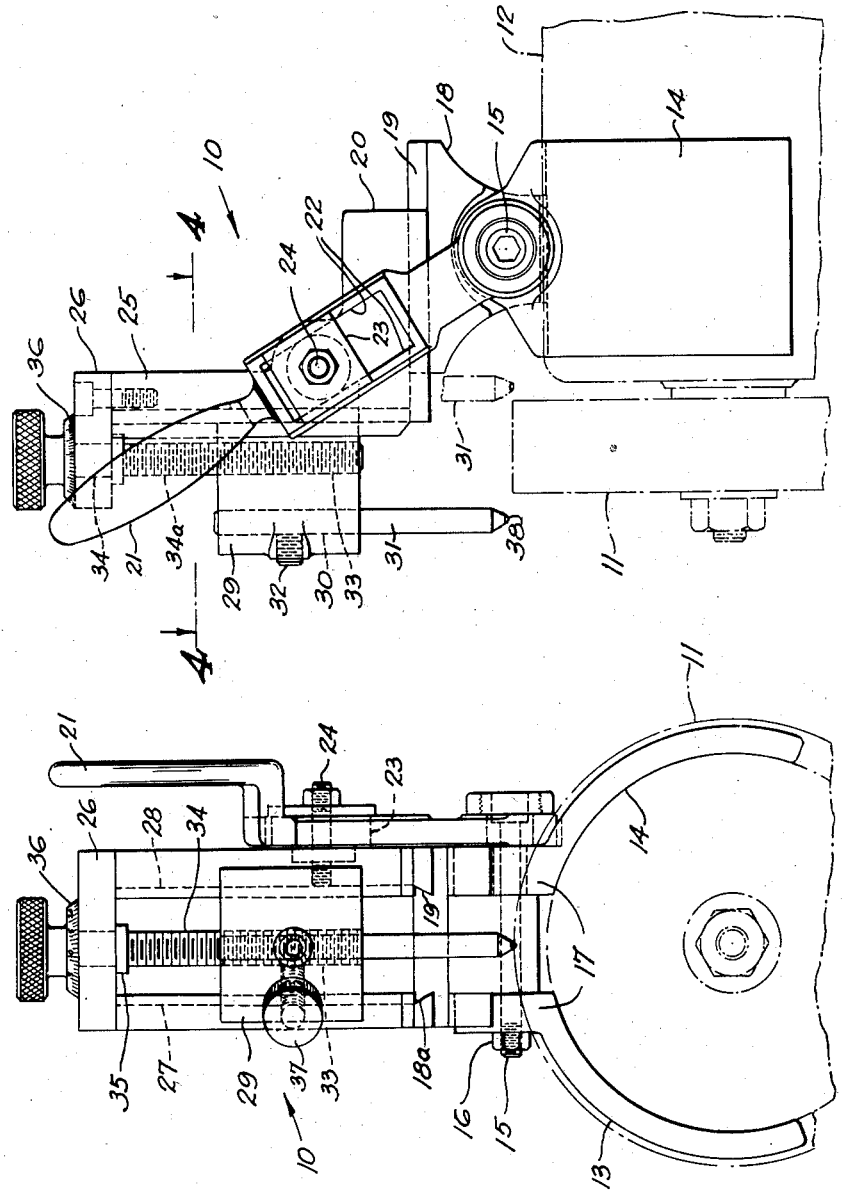
INVENTOR.
LOUIS DOERFLER
BY Richard J. Geier
ATTORNEYS Oct. 11, 1949.  L. DOERFLER  2,484,404
DRESSING TOOL Filed Nov. 13, 1947  2 Sheets-Sheet 2

INVENTOR.
LOUIS DOERFLER
BY Richard Leier
ATTORNEYS

Patented Oct. 11, 1949

2,484,404

UNITED STATES PATENT OFFICE 2,484,404

DRESSING TOOL

Louis Doerfler, Pompton Lakes, N. J.

Application November 13, 1947, Serial No. 785,669

3 Claims. (Cl. 125—11)

This invention relates to improvements in dressing tool devices and more particularily to improvements in dressing tool devices adapted to true the periphery of grinding wheels.

In the past, it has been necessary to remove the material being surfaced by the grinding wheel in order to true the periphery.

It is an object of the present invention to provide a dressing tool that may be applied to the grinding wheel without removing the work.

Another object is to provide a dressing tool of simple construction.

A further object is to reduce production costs based upon grinding wheel operations.

Other objects of the instant invention will become apparent in the course of the following specification.

In the attainment of these objectives, the supports for the dressing tool are designed for attachment by clamps over the housing of the motor driving the grinding wheel. A cradle is pivotally attached at the top of the clamps with longitudinal center line parallel with the center line of the motor shaft. The cradle carries a horizontal support adapted to be moved longitudinally in the cradle by a handle. At the front of the horizontal support is an upright member having a right angle member extending forwardly at the top. A dressing tool holder is attached on the front of the upright member and adapted to move vertically therealong. A dressing tool consisting of a spindle with a cutting edge on the end is vertically inserted in the dressing tool holder which is also provided with micrometric vertical adjusting means inserted vertically through the right angle member and threaded into the dressing tool holder. By this arrangement, the grinding wheel may be trued without removing the work. Furthermore, vertical adjustment of the dressing tool is provided by the pivotal mounting means of the cradle at the top of the clamps, and the rate of cutting as well as the depth thereof is always under the control of the operator.

The invention will appear more clearly when taken in connection with the accompanying drawing showing by way of example a preferred embodiment of the inventive idea.

In the drawings:

Figure 1 is a front elevational view of the dressing tool constructed in accordance with the principles of this invention.

Figure 2 is a side elevational view of the dressing tool shown in Figure 1.

Figure 3:
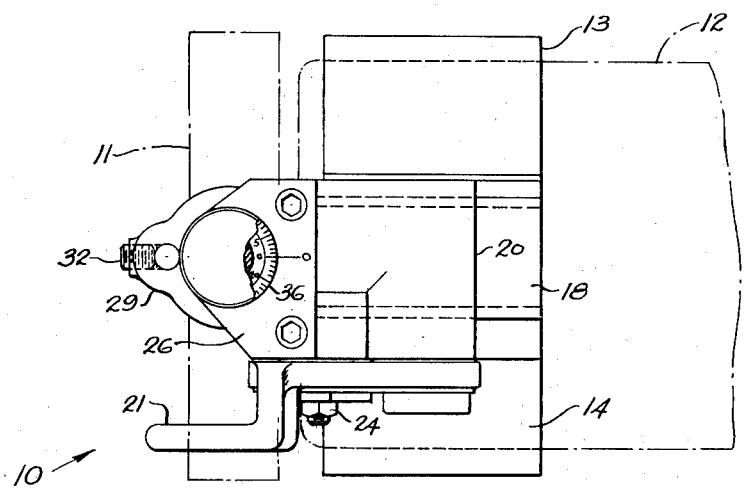
Figure 3 is a plan view of the dressing tool shown in Figure 1.
Figure 4:
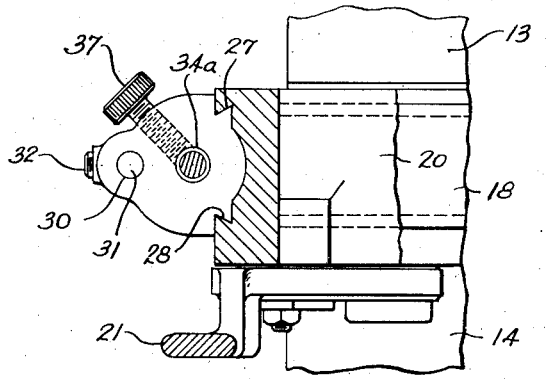
Figure 4 is a fragmentary sectional view along the line 4—4 of Figure 1, enlarged.

Referring now in greater detail to the drawings in which like reference numerals indicate like parts, reference numeral 10 indicates the dressing tool device, 11 the grinding wheel, and 12 the motor.

The dressing tool device 10 comprises the clamp members 13 and 14 adapted for insertion around the housing of the motor 12 and which are secured at the top by the bolt 15 and co-acting nut 16 threaded through upturned ears 17 at the top of the clamp members 13 and 14.

Between the clamp members 13 and 14 is the cradle 18 pivotally secured by the bolt 15 through an aperture in the base aligned with the apertures in the ears 17 and with longitudinal center line substantially parallel with the motor shaft. At the top of the cradle 17 on either side and extending longitudinally are the keyways 18a and 19.

The horizontal support 20 having coacting slides along the bottom surface portion is designed to move longitudinally along the cradle 18 in the keyways 18a and 19. In moving the horizontal support 20 in the manner described, the handle member 21 is pivotally attached over one end of the bolt 15. In the handle member 21 is the slot 22 having disposed therein the slide 23. A bolt 24 through an aperture in the slide 23 permits the horizontal support 20 to be moved longitudinally along the cradle 18 by the handle member 21 the variation in the diameter between the center line of the bolt 15 and the bolt 24 being compensated for by the slide 23 moving in the slot 22.

As so far described the dressing device is pivotally adjustable about the bolt 15 and longitudinally adjustable along the cradle 18.

At the front of the horizontal support 20 is the upright member 25 having a top or right angle member 26 turned outwardly substantially at right angles to the plane of the upright member 25. Obviously, the right angle member 26 may be formed integral with the upright member 25 or attached by any suitable means. Along the front edges of the upright member 25 are the vertical keyways 27 and 28 adapted to move the subsequently described dressing tool holder 29.

The dressing tool holder 29 comprises a body extending forwardly of the upright member 25 and at the back of which are slides co-acting with the keyways 27 and 28 for vertical movement. At the front of the tool holder 29 is the vertical aperture 30 designed for the insertion of the dressing tool 31 consisting of a spindle and cutting edge which is held in place by the set screw 32. In back of the tool holder 29 is the threaded tap 33 co-acting with the vertical aperture 34 in the right angle member 26 and through which the screw 34a is inserted for threading in the tap 33. The screw 34a is held in place under the right angle member 26 by the collar 35, and locked in place by the set screw 37. At the top of the screw 34 is the micro-metric dial 36.

In the end of the dressing tool 31 is the cutting edge 38 which may be of the usual commercial diamond type or otherwise as desired.

The operation is as follows:

The clamp members 13 and 14 are inserted over the housing of the motor 12 and tightened by the nut 16. The handle member 21 is moved, for example, to the front and the micro-metric dial 36 set for the desired cut of the grinding wheel 11. The motor 12 is then set in motion and the handle member 21 moved toward the back which carries the dressing tool 31 transversely across the periphery of the grinding wheel 11 truing the periphery as desired. Of course, where the dressing tool 31 is not in a true vertical position, the cradle 18 may be rotated to bring it in such position with the use of the ordinary level or a leveling member may be incorporated in the device as desired.

It is apparent that the specific illustration shown above has been given by way of illustration and not by way of limitation and that the structure above described is subject to wide variations and modifications without departing from the scope or intent of the present invention.

What is claimed is:

1. A dressing tool device for a rotatable grinding wheel comprising at least two clamping members, means adjustably securing the clamping members at the top, a cradle pivotally secured by the clamping means, longitudinal keyways on the cradle, a horizontal support co-acting with the keyways and adapted to be moved along the cradle, means moving the horizontal support along the cradle comprising a handle member, means pivotally mounting the base of the handle member at the top of the clamping members, the handle member having a slot formed therein, a slide in the slot having an aperture formed therein and a co-acting tap in the side of the horizontal support, a fastener through the aperture into the tap; the dressing tool further comprising an upright member disposed at the front of the horizontal support and movable therewith, a right angle member disposed substantially at right angles to the plane of the upright member and extending forwardly thereof and having a vertical aperture formed therein, vertical keyways on the front surface portion of the upright member, a spindle carrier slidably disposed in the vertical keyways of the upright member and extending forwardly thereof, a spindle, a cutting edge disposed on the end of the spindle, the tool holder having formed therein a vertical aperture adapted for the insertion of the spindle, a set screw through the end of the tool holder co-acting with the spindle, a tap in the spindle carrier, a screw inserted through the vertical aperture of the right angle member and threaded into the last-mentioned tap, a collar disposed around the screw under the right angle member, a dial handle disposed at the top of the screw co-acting with the top surface portion of the right angle member, the periphery of the dial being divided into segments simulative of portions of a unit of linear measure, and means for locking the screw.

2. A dressing tool device for a grinding wheel and a motor housing connected with said wheel, said device comprising clamping members removably disposed around the motor housing, a cradle, pivot means interconnecting said clamping members and said cradle and adjustably supporting said cradle at the top of the clamping members and perpendicular to said pivot means, longitudinal keyways on the cradle, a co-acting horizontal support movable in the keyways, an upright member at the front of the horizontal support and movable therewith, a spindle, means vertically moving the spindle on the upright member, a handle member pivotally mounted upon said pivot means, and means interconnecting said handle member and said horizontal support to cause said support to move along said keyways when said handle member is turned about said pivot means.

3. A dressing tool device according to claim 2 in which the interconnecting means comprise a co-acting slide in a slot formed in the handle member, an aperture through the slide, a co-acting tap in the side of the horizontal support, and a fastener through the aperture in the slide threaded into the tap.

LOUIS DOERFLER.

REFERENCES CITED

The following references are of record in the file of this patent:

UNITED STATES PATENTS

| Number | Name | Date |
|---|---|---|
| 769,945 | Howland | Sept. 13, 1904 |
| 887,059 | Belden | May 12, 1908 |
| 1,508,939 | Reeves | Sept. 16, 1924 |
| 1,596,701 | Williams | Aug. 17, 1926 |
| 1,999,435 | Albertson | Apr. 30, 1935 |